United States Patent
Takaki et al.

(10) Patent No.: US 9,970,368 B2
(45) Date of Patent: May 15, 2018

(54) EGR CONTROL DEVICE AND EGR CONTROL METHOD

(71) Applicant: NISSAN MOTOR CO., LTD., Yokohama-shi, Kanagawa (JP)

(72) Inventors: Daisuke Takaki, Kanagawa (JP); Hirofumi Tsuchida, Kanagawa (JP); Kazuhiko Sugawara, Kanagawa (JP); Kenji Suzuki, Kanagawa (JP); Takayuki Sui, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 19 days.

(21) Appl. No.: 15/312,021

(22) PCT Filed: May 21, 2014

(86) PCT No.: PCT/JP2014/063492
§ 371 (c)(1),
(2) Date: Nov. 17, 2016

(87) PCT Pub. No.: WO2015/177888
PCT Pub. Date: Nov. 26, 2015

(65) Prior Publication Data
US 2017/0082044 A1  Mar. 23, 2017

(51) Int. Cl.
*F02D 41/00* (2006.01)
*F02D 45/00* (2006.01)
(Continued)

(52) U.S. Cl.
CPC ........ *F02D 41/0052* (2013.01); *F02D 21/08* (2013.01); *F02D 41/0072* (2013.01);
(Continued)

(58) Field of Classification Search
CPC .. F02D 41/00; F02D 41/0052; F02D 41/0072; F02D 2041/0067;
(Continued)

(56) References Cited

U.S. PATENT DOCUMENTS 6,729,301 B2 * 5/2004 Nakamori ........... F02D 41/0072
123/406.48
7,207,170 B2 * 4/2007 Fukuma ................ F01N 3/0807
60/274
(Continued)

FOREIGN PATENT DOCUMENTS

DE 10153322 A1 7/2002
DE 10325847 A1 3/2004
(Continued)

*Primary Examiner* — Hieu T Vo
(74) *Attorney, Agent, or Firm* — Foley & Lardner LLP

(57) ABSTRACT

An EGR control device includes an estimate EGR ratio calculating portion adapted to calculate an estimate EGR ratio from a fresh air flow amount at a joining portion with the EGR passage of an intake passage and an EGR gas amount passing through the EGR valve, and a joining portion EGR ratio estimating portion adapted to correct an estimate EGR ratio on the basis of a gaseous state inside the introduction passage when the EGR valve switches from a closed state to an open state, to calculate a joining portion EGR ratio being a proportion of an EGR gas amount with respect to fresh air in the joining portion.

11 Claims, 12 Drawing Sheets

(51) Int. Cl.
  *F02D 21/08* (2006.01)
  *F02M 26/00* (2016.01)
  *F02M 26/47* (2016.01)
  *F02M 26/52* (2016.01)

(52) U.S. Cl.
  CPC ............ *F02D 45/00* (2013.01); *F02M 26/00* (2016.02); *F02M 26/47* (2016.02); *F02M 26/52* (2016.02); *F02D 2041/0067* (2013.01); *F02D 2041/0075* (2013.01)

(58) Field of Classification Search
  CPC .. F02D 2041/0075; F02D 45/00; F02D 21/08; F02M 26/00; F02M 26/47; F02M 26/52
  See application file for complete search history.

(56) References Cited

U.S. PATENT DOCUMENTS

| | | | |
|---|---|---|---|
| 8,706,385 B2 * | 4/2014 | Nakayama | ............ F02D 41/0072 123/568.11 |
| 2003/0226544 A1 | 12/2003 | Nakamori et al. | |
| 2015/0184587 A1 * | 7/2015 | Komiya | .................. F02B 37/18 123/568.21 |

FOREIGN PATENT DOCUMENTS

| | | |
|---|---|---|
| EP | 1 416 138 A2 | 5/2004 |
| EP | 2 065 587 A2 | 6/2009 |
| JP | 2001-254659 A | 9/2001 |
| JP | 2007-278116 A | 10/2007 |

* cited by examiner

EGR CONTROL DEVICE AND EGR CONTROL METHOD

TECHNICAL FIELD

The present invention relates to a control device and a control method for an EGR device that recirculates a portion of exhaust air into an intake passage as exhaust gas recirculation (Exhaust Gas Recirculation; hereinafter, called "EGR") gas.

BACKGROUND ART

There is known of an EGR device that allows for preventing knocking and improving fuel economy performance by recirculating a portion of exhaust air onto an intake side thereof as EGR gas. The EGR device is generally configured including: an EGR passage branching out from an exhaust passage and joining to an intake passage; and an EGR valve disposed in the EGR passage adapted to open and close to control an EGR gas amount. When performing EGR control in which the EGR gas is introduced, a controller of the internal combustion engine opens the EGR valve to achieve a target EGR ratio set in accordance with an engine operating state. However, a delay occurs from when the EGR valve is opened to until the actual EGR ratio reaches the target EGR ratio; hence, if an ignition timing is switched to one according to the target EGR ratio simultaneously to the opening of the EGR valve, knocking will occur. Accordingly, the controller calculates an estimate EGR ratio on the basis of for example a position of the EGR valve and engine rotation speed, and controls the ignition timing in response to the estimate EGR ratio, to prevent the knocking.

When an EGR control non-performed state continues, a part of the EGR passage from a joining portion with the intake passage to the EGR valve is filled with fresh air. When the EGR control is started at this state, only the fresh air will be pushed outside to the intake passage for the first while, even if the EGR valve is opened, and the EGR gas will not be introduced into the intake passage. Therefore, until a pipe from the EGR valve to the joining portion is filled with EGR gas, a divergence will generate between the actual EGR ratio (true EGR ratio) and the estimate EGR ratio; at an ignition timing set on the presumption of having a higher estimate EGR ratio than the true EGR ratio, the knocking would occur.

In JP2007-278116A, in order to prevent the above divergence between the true EGR ratio and estimate EGR ratio, a valve is further provided at the joining portion of the EGR passage and the intake passage, to fill the pipe between that valve and the EGR valve with EGR gas. This introduces the EGR gas into the intake passage immediately after the start of the EGR control, and thus allows for preventing the divergence between the estimate EGR ratio and the actual EGR ratio.

SUMMARY OF INVENTION

However, in the configuration of the above document, a further valve is required in addition to the EGR valve; this causes an increase in costs, and the valve control also becomes complex. Moreover, when a rubber joint is used at the joining portion of the intake passage and the EGR passage as a vibration countermeasure or the like, it is difficult to provide the valve of the above document, and as a matter of course, it is also difficult to provide the EGR valve.

On this account, an object of the present invention is to provide an EGR control device and EGR control method that allow for accurately estimating a true EGR ratio.

DESCRIPTION OF EMBODIMENTS

Described below is an embodiment of the present invention, with reference to drawings.

First Embodiment

Figure 1:
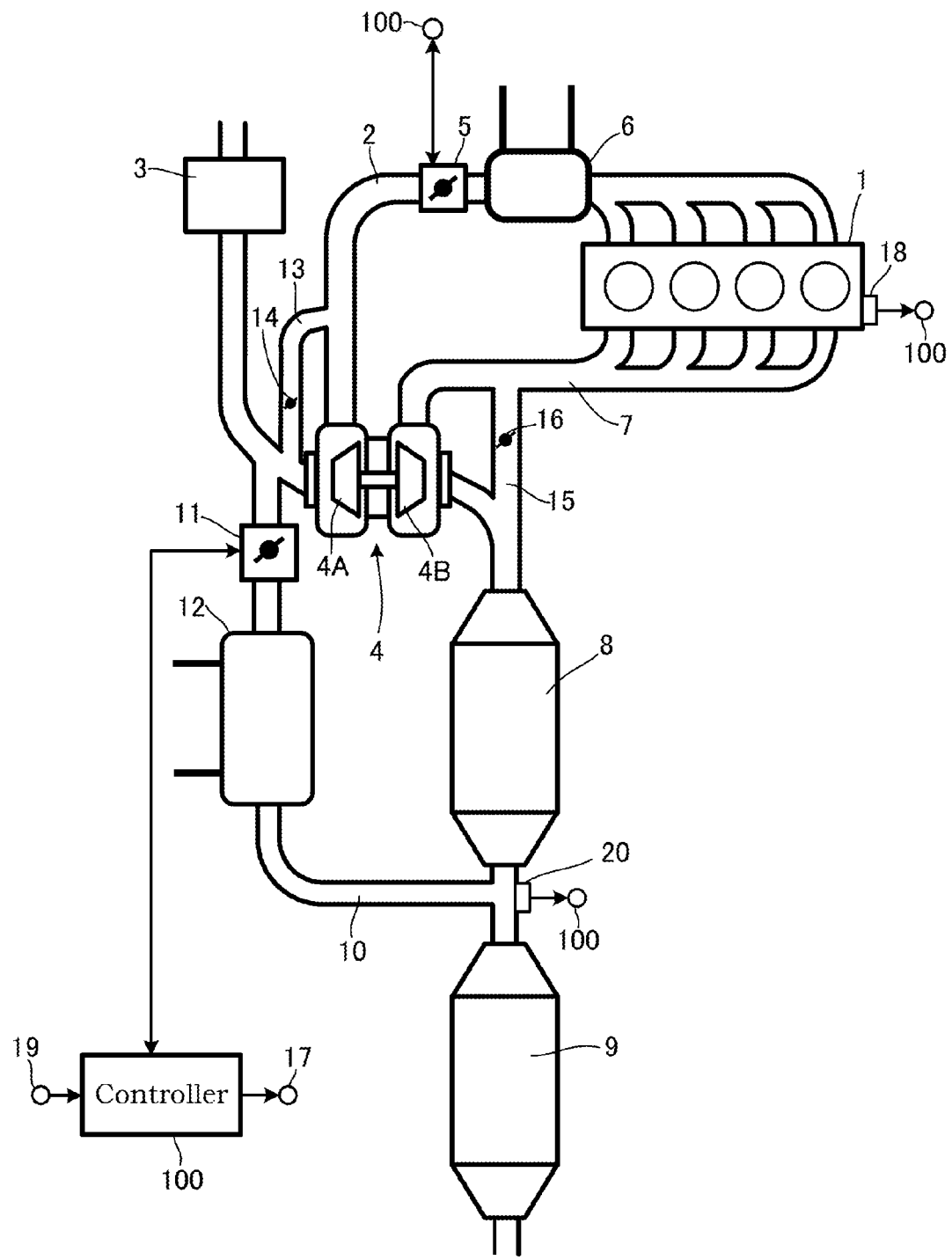
FIG. 1 is a block diagram of an internal combustion engine system that applies an embodiment of the present invention.

FIG. 1 is a block diagram of an internal combustion engine system that applies an embodiment of the present invention.

An intake passage 2 of an internal combustion engine 1 is arranged to have, from upstream of an intake flow, an air flow meter 3, a compressor 4A of a turbo supercharger 4, a throttle chamber 5, and a collector tank 6 on an intercooler integral side.

The present system includes a recirculation passage 13 that communicates an upstream side and a downstream side of the compressor 4A, and a recirculation valve 14 that opens when decelerated to return the intake from the downstream side of the compressor 4A to the upstream side thereof.

Meanwhile, an exhaust passage 7 is arranged to have, from upstream of the exhaust flow, a turbine 4B of the turbo supercharger 4, a manifold catalyst 8, and an underfloor catalyst 9. The present system includes a bypass passage 15 that communicates an upstream side and downstream side of the turbine 4B, and a valve 16 that opens and closes the flow passage of the bypass passage 15.

The manifold catalyst 8 and the underfloor catalyst 9 are both a catalytic device for purifying exhaust gas. The manifold catalyst 8 is arranged at a position close to the turbine 4B on a downstream side thereof so that exhaust gas can flow therein at a high temperature. The underfloor catalyst 9 is greater in volume than the manifold catalyst 8, and is arranged under the floor of the vehicle.

Moreover, the present system includes an exhaust gas recirculation device (hereinafter, also called "EGR device"). The EGR device is configured including an exhaust gas recirculation passage (hereinafter, also called "EGR passage") 10 that branches from between the manifold catalyst 8 and the underfloor catalyst 9 of the exhaust passage 7 and joins to the intake passage 2 at a position upstream of the compressor 4A and downstream of the air flow meter 3, and a recirculation valve (hereinafter, also called "EGR valve") 11 that adjusts an amount of exhaust gas (hereinafter, also called "EGR gas") passing through the EGR passage 10. Furthermore, the device may include an EGR cooler 12 for cooling the EGR gas.

As described above, the EGR device of the present embodiment is what is called a low pressure EGR device that recirculates a portion of the exhaust gas from downstream of the turbine 4B to upstream of the compressor 4A and downstream of the air flow meter 3.

The internal combustion engine system described above further includes: a crank angle sensor 18 for detecting revolution speed of the internal combustion engine 1 (hereinafter, also called engine revolution speed); an accelerator pedal position sensor 19; and an exhaust air temperature sensor 20, and detected values of these sensors and the air flow meter 3 are read into the controller 100. The controller 100 performs, on the basis of the detected values read in, controls such as fuel injection control, throttle valve position control, and control of the EGR device (EGR control).

The controller 100 may also function as an estimate EGR ratio calculating portion and a joining portion EGR ratio estimating portion, in the EGR control. The following describes about the EGR control.

Figure 2:
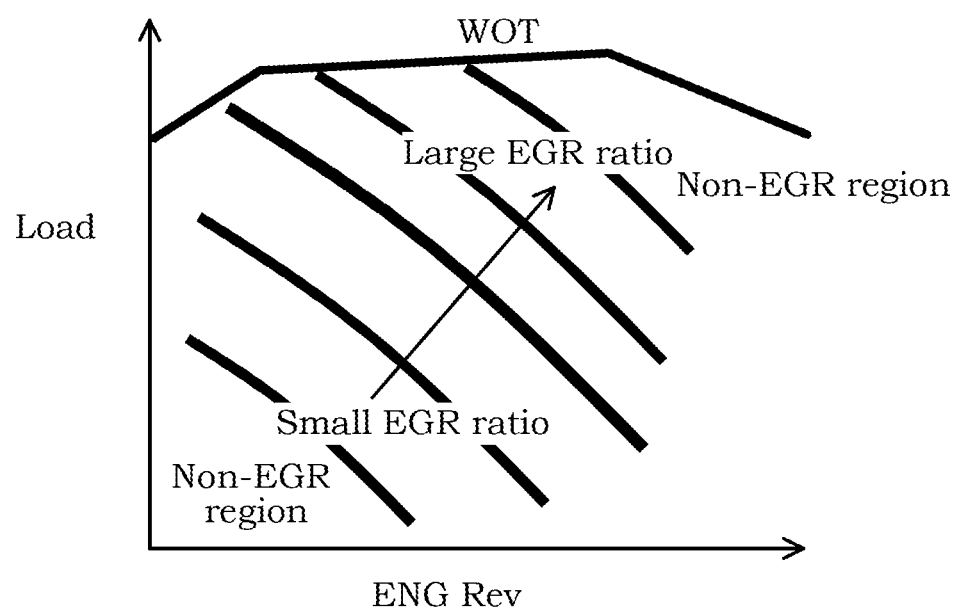
FIG. 2 is a view showing one example of a target EGR ratio map.

In the EGR control, the controller 100 first determines a target EGR ratio by map search or the like on the basis of an engine operating state (for example, engine revolution speed and load), and controls the EGR valve position in accordance with the target EGR ratio. The map used in determining the target EGR ratio is set having a larger target EGR ratio as the load increases and as the engine revolution speed increases, in a region in which the EGR control is performed (hereinafter, also called "EGR region"), for example as shown in FIG. 2.

The EGR valve position in accordance with the target EGR ratio is found by mapping a relationship between the target EGR ratio and the EGR valve position in advance for each intake air amount, and searching the map. The mapping is carried out for each intake air amount because the required position to achieve the same target EGR ratio differs between a region having a low front-and-rear differential pressure of the EGR valve 11 as like a low-revolution low-load region and a region having a high front-and-rear differential pressure of the EGR valve 11 as like a high-revolution high-load region. That is to say, in the case of identical target EGR ratios, in the region having a low front-and-rear differential pressure, the positioning of the EGR valve 11 needs to be larger than that of the region having a high front-and-rear differential pressure.

Next describes a case in which an operating point switches from a region in which no EGR control is performed (hereinafter, "non-EGR region") to the EGR region.

Figure 3:
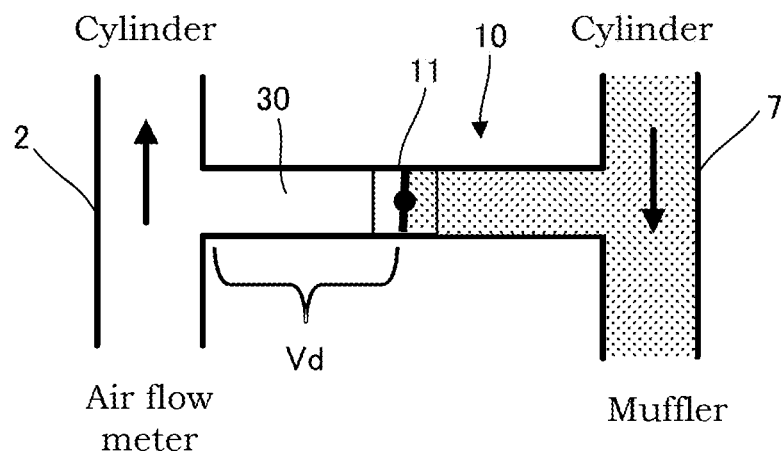
FIG. 3 is a view showing an EGR passage in an EGR non-introduced state.
Figure 4:
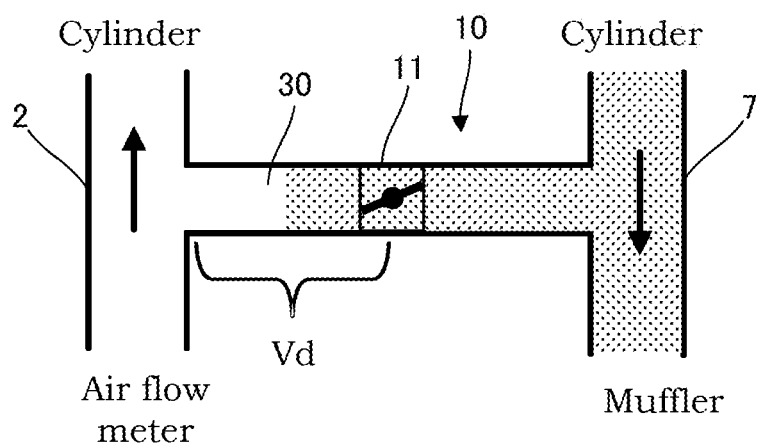
FIG. 4 is a view showing an EGR passage in an EGR introduced state.

FIG. 3 and FIG. 4 are views that simplify the EGR passage 10. FIG. 3 shows a case in which the operating point is in the non-EGR region (hereinafter, also called "EGR non-introduced state"), and FIG. 4 shows a case in which the operating point is in the EGR region (hereinafter, also called "EGR introduced state"). The hatched parts in FIGS. 3 and 4 indicate the exhaust gas.

Immediately after switching from the EGR introduced state to the EGR non-introduced state, a part in the EGR passage 10 on the intake passage 2 side than the EGR valve 11 (hereinafter, also called "introduction passage 30") is filled with EGR gas. However, together with the elapse of time from when the EGR valve 11 is closed, the filled EGR gas is sucked out to the intake passage 2 by the fresh air flowing inside the intake passage 2, and eventually the introduction passage 30 will be filled with fresh air, as shown in FIG. 3.

When the EGR valve 11 opens from the state of FIG. 3, just the fresh air in the introduction passage 30 is pushed out to the intake passage 2 by the EGR gas, as shown in FIG. 4, and EGR gas is not introduced into the intake passage 2. That is to say, until the introduction passage 30 is filled with EGR gas after the EGR valve 11 is opened, no EGR gas will be introduced into the intake passage 2. Therefore, estimation of the EGR ratio at the joining portion of the intake passage 2 with the EGR passage 10 without considering the volume Vd of the introduction passage 30 would cause a divergence between the actual EGR ratio and an estimate EGR ratio.

Figure 5:
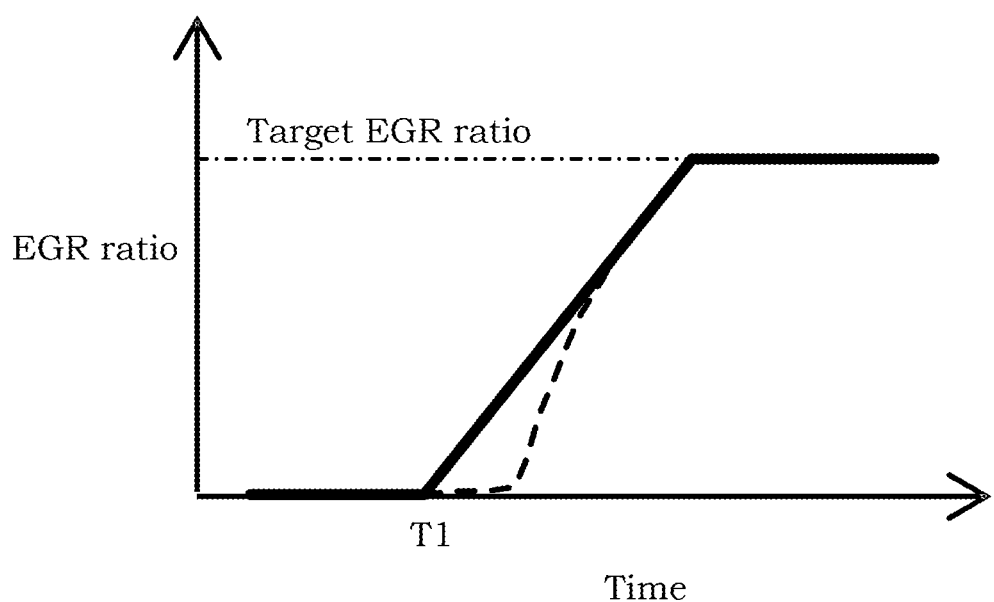
FIG. 5 is a view showing an EGR ratio variation characteristic.

FIG. 5 is a timing chart showing a variation characteristic of the EGR ratio. The solid line in the drawing shows an estimate EGR ratio calculated on the basis of the target EGR ratio and the EGR gas amount passing through the EGR valve 11 without considering the volume Vd of the introduction passage 30, and the broken line shows the actual EGR ratio.

When the EGR valve 11 is opened at a timing T1, the estimate EGR ratio increases in proportion to the elapsed time, and reaches the target EGR ratio. A gradient in the estimated EGR ratio until reaching the target EGR ratio, that is to say, the EGR introduction speed, increases as the positioning of the EGR valve 11 opens to a larger position. Generally, in order to reach the target EGR ratio quickly, a greater EGR introducing speed is desired.

On the other hand, the actual EGR ratio is slow in starting to increase as compared to the estimate EGR ratio, since immediately after opening, the fresh air inside the introduction passage 30 is just pushed out into the intake passage 2, as described above. Therefore, when the ignition timing is controlled on the basis of the estimate EGR ratio, knocking may occur while the actual EGR ratio is lower than the estimate EGR ratio.

The knocking caused by the divergence between the estimated EGR ratio and the actual EGR ratio can be minimized by reducing the EGR introduction speed. This is because, as the EGR introduction speed is reduced, the divergence between the estimate EGR ratio and the actual EGR ratio during the delayed time until the actual EGR ratio starts to increase becomes small. However, as the EGR introducing speed decreases, a time required to reach the target EGR ratio extends; this causes a time operated at the target EGR ratio to decrease. That is to say, the time in which the effect by the EGR gas introduction is achieved is shortened.

On this account, the controller 100 performs an EGR control as described below to prevent the knocking caused by the divergence between the estimated EGR ratio and the actual EGR ratio, without reducing the EGR introduction speed.

Figure 6:
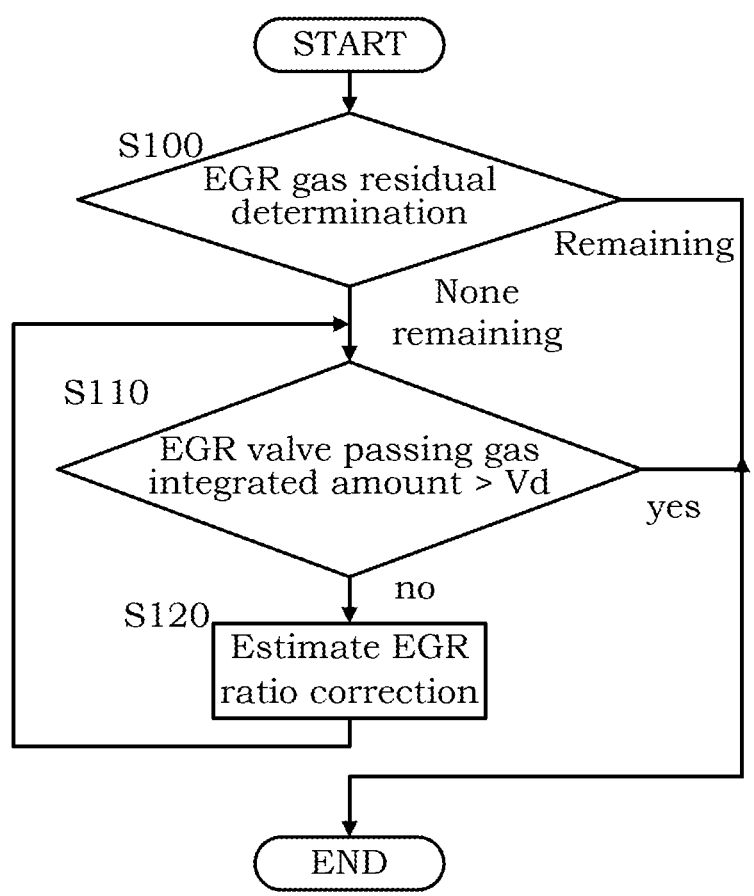
FIG. 6 is a flow chart showing an estimate EGR ratio correction operation routine of a first embodiment.

FIG. 6 is a flow chart showing a routine of a correction operation of the estimate EGR ratio, performed by the controller 100.

In step S100, the controller 100 determines whether or not the EGR gas remains inside the introduction passage 30, and ends the process if it remains, and performs the process of step S110 if it does not remain.

Figure 7:
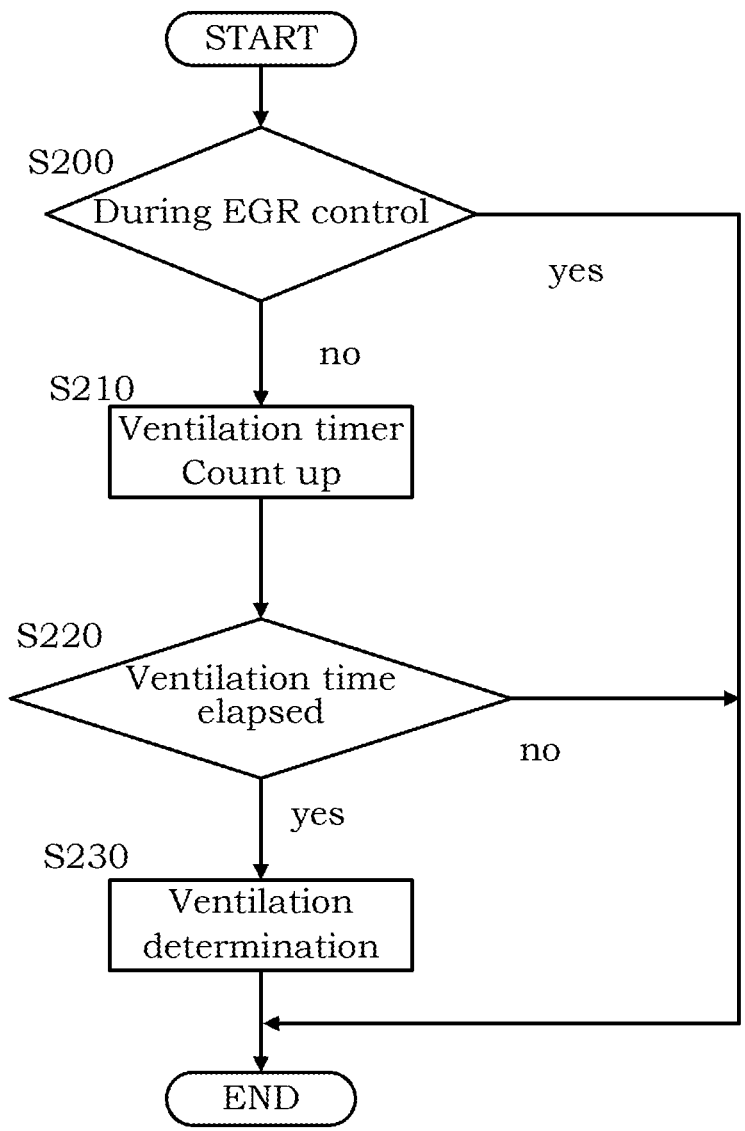
FIG. 7 is a flow chart showing a routine for determining whether or not the EGR gas remains.

Whether or not the EGR gas remains in the introduction passage 30 can be determined by various methods; in this embodiment, a method of determining on the basis of an elapsed time after closing the EGR valve 11 is described as one example, with reference to FIG. 7.

FIG. 7 is a flow chart showing a control routine performed by the controller 100, for determining whether or not the EGR gas is remaining. The present control routine is performed repetitively in short intervals of for example around a few milliseconds.

In step S200, the controller 100 determines whether or not the EGR control is being performed, and if the EGR control is being performed, the process ends, and if no EGR control is being performed, the process of step S210 is performed.

In step S210, the controller 100 measures an elapsed time from when the EGR valve 11 closes, with a built-in ventilation timer.

In step S220, the controller 100 determines whether or not the elapsed time from when the EGR valve 11 closes is not less than a ventilation time set in advance. The ventilation time is a time from when the EGR valve 11 closes to until the introduction passage 30 becomes a ventilated state in which the inside thereof is completely replaced with fresh air, and is calculated by experiment and the like for each internal combustion engine 1 to which the present control routine is applied.

The controller 100 ends the process if the elapsed time from when the EGR valve 11 closes is within the ventilation time, and performs the process of step S230 if equal to or more than the ventilation time.

In step S230, the controller 100 determines that the inside of the introduction passage 30 is in a ventilated state, that is to say, is replaced with fresh air.

As described above, in the present embodiment, it is determined as in the ventilated state when the inside of the introduction passage 30 is completely replaced with fresh air.

Returning back to the description of FIG. 6.

In step S110, the controller 100 determines whether or not a value multiplying a volume flow amount of the EGR gas passing through the EGR valve 11 (hereinafter, also called "EGR valve passing gas integrated amount") is greater than a volume Vd of the introduction passage 30, that is to say, whether or not the inside of the introduction passage 30 is filled with the EGR gas. The controller 100 ends the current routine when the EGR valve passing gas integrated amount is greater than the volume Vd, and performs the process of step S120 if smaller.

The EGR valve passing gas integrated amount may be calculated by a publicly known method. For example, considering that the EGR valve 11 is an orifice in which a flow passage section of the EGR passage 10 is narrowed, an EGR valve passing gas amount is calculated on the basis of the position of the EGR valve 11, a differential pressure between the intake side and the exhaust side that sandwich the EGR valve 11, and the temperature of the EGR gas passing through the EGR valve 11, and is integrated.

The temperature of the EGR gas passing through the EGR valve 11 used here is one estimated from a detected value of the exhaust air temperature sensor 20 provided in the exhaust passage 7 and a temperature decreased amount estimated from the cooling performance of the EGR cooler 12. This also may be detected by providing a sensor for detecting a temperature after the EGR gas passes through the EGR cooler 12.

Moreover, the EGR valve passing gas integrated amount can also be found by multiplying an EGR valve passing gas amount calculated on the basis of the target EGR ratio and a fresh air amount detected by the air flow meter 3. This is because the EGR gas amount necessary for achieving the target EGR ratio is found on the basis of the fresh air amount and the target EGR ratio, and the position of the EGR valve 11 is controlled so that the above EGR gas amount passes therethrough.

In step S120, the controller 100 corrects the estimate EGR ratio and calculates a joining portion EGR ratio estimate value as described later, and performs step S110 again. That is to say, the controller 100 repetitively performs the correction of the estimate EGR ratio until the inside of the introduction passage 30 is completely replaced with the EGR gas.

After the present routine ends, the joining portion EGR ratio estimated value is calculated on the basis of the EGR valve passing gas amount, as with the general estimate EGR ratio calculation method.

Figure 8:
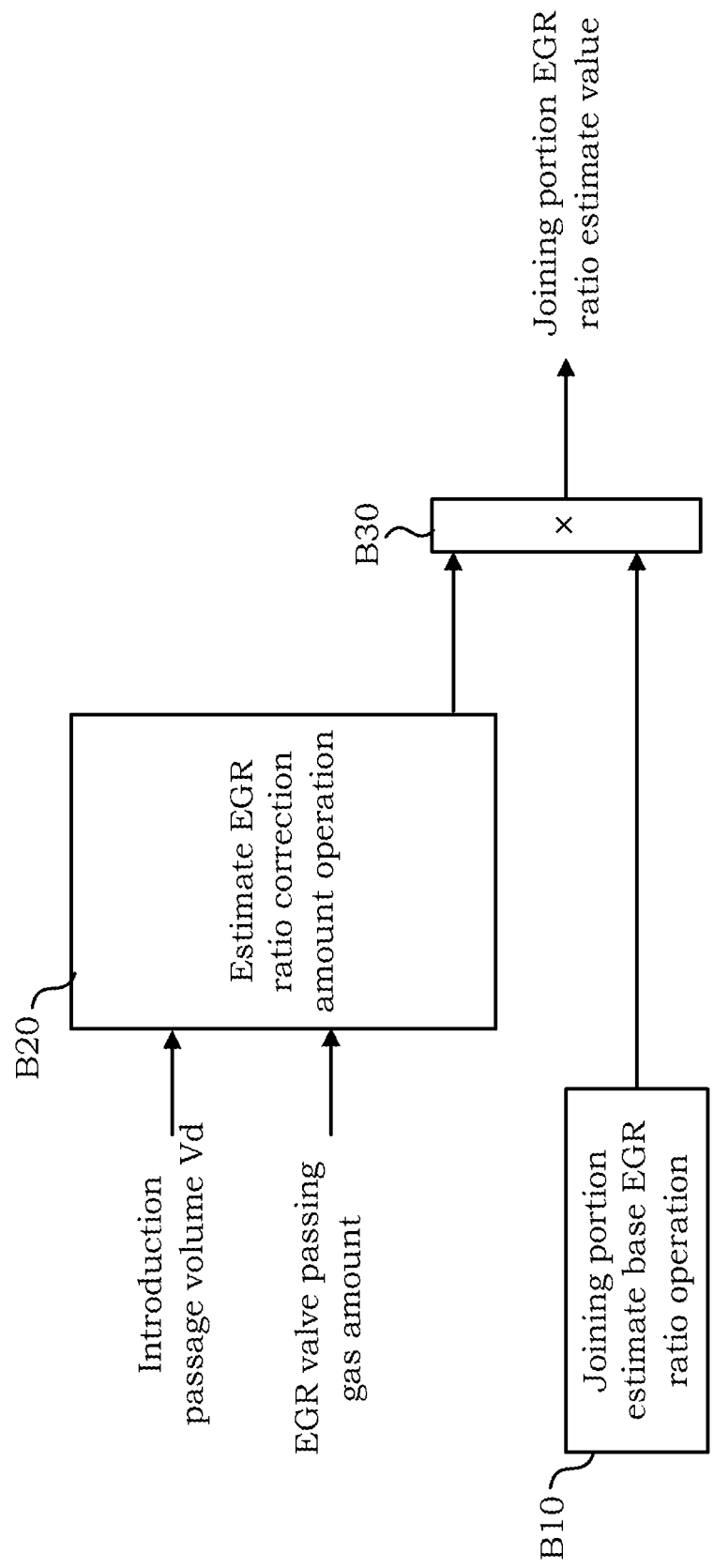
FIG. 8 is a block diagram showing details of an operation for calculating a joining portion EGR ratio estimate value of the first embodiment.

FIG. 8 is a block diagram showing details of an operation for calculating the above-mentioned joining portion EGR ratio estimate value. The estimate EGR ratio correction value operating portion B20 and correction operating portion B30 correspond to step S120 in FIG. 7.

The joining portion estimate base EGR ratio operating portion B10 calculates, on the basis of an EGR valve position, an estimate EGR ratio at a joining portion of the intake passage 2 with the EGR passage 10 (hereinafter, also called "joining portion estimate base EGR ratio"). The joining portion estimate base EGR ratio is an EGR ratio calculated on the basis of the fresh air amount flowing through the intake passage 2 and the EGR valve passing gas amount, without considering the volume Vd of the introduction passage 30, and corresponds to the EGR ratio shown by the solid line in FIG. 5.

The estimate EGR ratio correction amount operating portion B20 calculates an estimate EGR ratio correction amount on the basis of the volume Vd of the introduction passage 30 and the EGR valve passing gas amount. The volume Vd of the introduction passage 30 is determined from the specification of the internal combustion engine 1 to which the present embodiment is applied. The EGR valve passing gas amount is a value used for calculating the EGR valve passing gas integrated amount in step S110.

In the estimate EGR ratio corrected amount operating portion B20, an estimate EGR ratio correction amount for correcting the estimate EGR ratio to the actual EGR ratio is determined as described later, from the EGR valve passing gas integrated amount having been integrated with the EGR valve passing gas amount, and the volume Vd of the introduction passage 30.

Here, a description is provided for the calculation method of the estimate EGR ratio correction amount.

At the opening timing of the EGR valve 11, no EGR gas exists inside the introduction passage 30 but is in a gaseous state in which only fresh air exists therein; the fresh air amount and EGR gas amount within the introduction passage 30 is found from the volume Vd of the introduction passage 30 and the EGR valve passing gas integrated amount. Furthermore, the estimate EGR ratio is calculated as one in which the EGR valve passing gas is introduced into the intake passage 2, and thus the difference between the estimate EGR ratio and the actual EGR ratio is found on the basis of the gaseous state inside the introduction passage 30 and the EGR valve passing gas amount. Once the difference between the estimate EGR ratio and the actual EGR ratio is found, the estimate EGR ratio correction amount is found.

With a smaller amount of the EGR gas within the introduction passage 30, that is to say, with a shorter elapsed time from when the EGR valve 11 opens, the difference between the estimate EGR ratio and the actual EGR ratio increases, and thus the estimate EGR ratio correction amount increases.

In the correction operating portion B30, the joining portion EGR ratio estimate value is calculated from the joining portion estimate base EGR ratio and the estimate EGR ratio correction amount. That is to say, the joining portion EGR ratio estimate value is calculated by subtracting the estimate EGR ratio correction amount from the joining portion estimate base EGR ratio.

Next described is the effect of the present embodiment.

(1) In the present embodiment, the controller 100 calculates the estimate EGR ratio from a fresh air flow amount at a joining portion of the intake passage 2 with the EGR passage 10 and the EGR gas amount that passes through the EGR valve 11. Furthermore, the controller 100 calculates the joining portion EGR ratio estimate value by correcting the estimate EGR ratio on the basis of the gaseous state inside the introduction passage 30, in a case in which the EGR valve 11 switches from a closed state to an open state. This minimizes the divergence between the joining portion EGR ratio estimate value and the actual EGR ratio. Therefore, by the controller 100 controlling the ignition timing on the basis of the joining portion EGR ratio estimate value, it is possible to prevent the knocking without causing the EGR introduction speed to decrease.

(2) In the present embodiment, the controller 100 performs the correction of the estimate EGR ratio until the EGR valve passing gas integrated amount exceeds the volume Vd of the introduction passage 30. This makes it possible to estimate with good accuracy the actual EGR ratio during the period in which just the fresh air is pushed out from inside the introduction passage 30 and no increase occurs to the EGR ratio.

(3) In the present embodiment, the controller 100 calculates the EGR valve passing gas integrated amount on the basis of the position of the EGR valve, the front-and-rear differential pressure of the EGR valve, and the temperature of the EGR gas, and thus it is possible to improve the calculation accuracy of the EGR valve passing gas integrated amount.

(4) In the present embodiment, the controller 100 controls the position of the EGR valve 11 on the basis of the target EGR ratio and the fresh air amount calculated on the basis of the engine operating state; it is thus possible to achieve the target EGR ratio, without depending on the differential pressure between the intake side and the exhaust side that sandwich the EGR valve 11.

(5) In the present embodiment, the controller 100 can calculate the EGR valve passing gas integrated amount on the basis of the target EGR ratio and the fresh air amount detected by the air flow meter, instead of the calculation method of the above (3). In this case also, it is possible to improve the calculation accuracy of the EGR valve passing gas integrated amount, as with the above (3).

(6) In the present embodiment, the controller 100 corrects the estimate EGR ratio just in the case in which the inside of the introduction passage 30 is in the ventilation state in which it is filled with fresh air when the EGR valve 11 is opened. This allows for preventing the joining portion EGR ratio estimate value from becoming smaller than the actual EGR ratio. As a result, the ignition timing will not be excessively delayed, thus allowing for preventing the decrease in fuel economy performance.

(7) In the present embodiment, the controller 100 determines as the ventilated state once the EGR valve 11 is in a closed state for a predetermined time or more; this allows for alleviating the operation load required in deciding whether or not it is in the ventilated state.

Second Embodiment

The second embodiment has the same configuration of the internal combustion engine system as the first embodiment, however differs in the calculation method of the joining portion EGR ratio estimate value.

Figure 9:
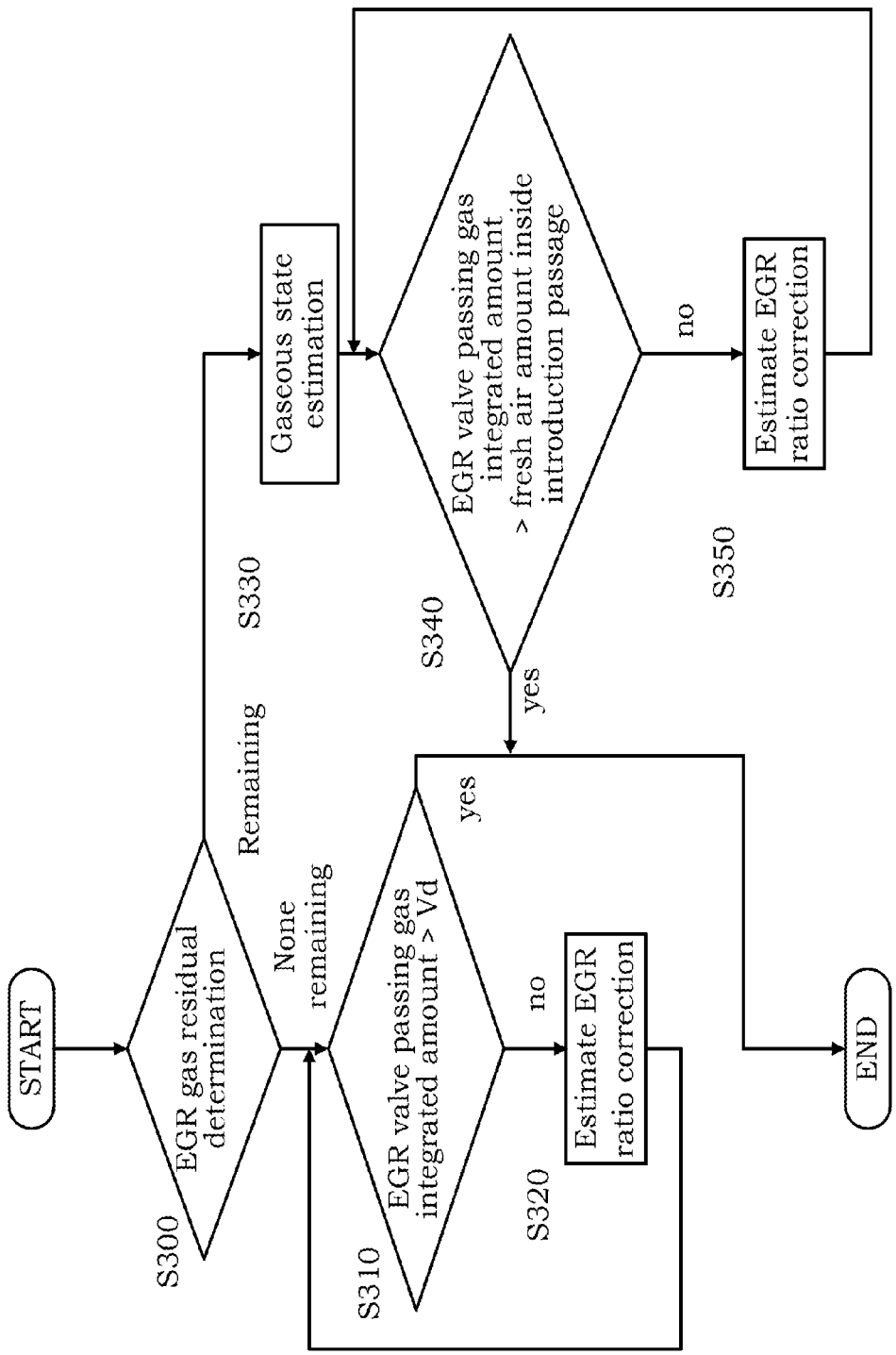
FIG. 9 is a flow chart showing an estimate EGR ratio correction operation routine of a second embodiment.

FIG. 9 is a flow chart of a control routine performed by the controller 100, when switching from the EGR gas non-introduced state to the EGR gas introduced state in the present embodiment. Steps S300 to S320 are the same as the steps S100 to S120 of FIG. 6, so their explanations have been omitted.

The controller 100 performs the process of step S330 when determining in step S300 that the EGR gas remains inside the introduction passage 30.

In step S330, the controller 100 estimates the gaseous state inside the introduction passage 30 at the timing that the EGR valve 11 opens, that is to say, the fresh air amount inside the introduction passage 30. For example, by creating a time variation model in the fresh air amount from when the introduction passage 30 is entirely in the EGR gas state to after the EGR valve 11 is closed and the introduction passage 30 becomes in the ventilated state by for example experiments in advance, it is possible to estimate the fresh air amount by using counted values of the ventilation timer used in the control routine of FIG. 7. Moreover, a plurality of models in accordance with the fresh air flow amount of the intake passage 2 may be prepared.

After estimating the gaseous state inside the introduction passage 30 as described above, the controller 100 determines in step S340 of whether or not the EGR valve passing gas integrated amount has exceeded the fresh air amount inside the introduction passage 30. When the EGR valve passing gas integrated amount is greater than the fresh air amount inside the introduction passage 30, this routine ends, and when it is smaller, the process of step S350 is performed.

In step S350, the controller 100 corrects the estimated EGR ratio as described later, and calculates the joining portion EGR ratio estimate value. The controller 100 repetitively performs the process of step S350 until the EGR valve passing gas integrated amount becomes greater than the fresh air amount inside the introduction passage 30.

After the present routine ends, the joining portion EGR ratio estimate value is calculated on the basis of the EGR valve passing gas amount, as with the first embodiment.

Figure 10:
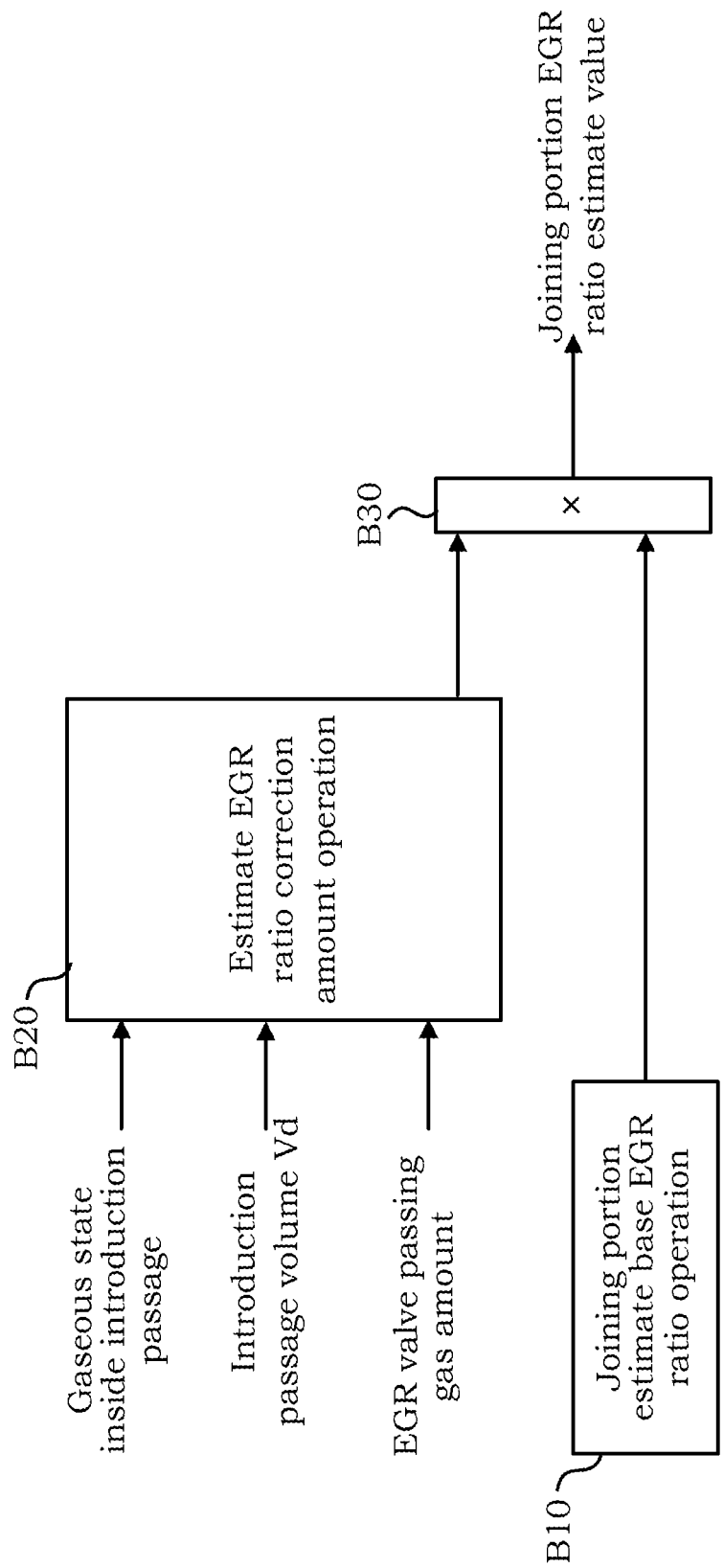
FIG. 10 is a block diagram showing details of an operation for calculating a joining portion EGR ratio estimate value of the second embodiment.

FIG. 10 is a block diagram showing details of operation for calculating the aforementioned joining portion EGR ratio estimation value. The difference from FIG. 8 is that into the estimated EGR ratio correction amount operating portion B20, the gaseous state inside the introduction passage 30 at the timing that the EGR valve 11 opens is read in, other than the volume Vd of the introduction passage 30 and the EGR valve passing gas amount.

In the present embodiment, the estimate EGR ratio correction amount operating portion B20 estimates the gaseous state inside the introduction passage 30 from the EGR valve passing gas integrated amount and the volume Vd of the introduction passage 30, by having the gaseous state at the timing that the EGR valve 11 opens serve as its initial state. Thereafter, as with the first embodiment, the estimate EGR ratio correction amount operating portion B20 calculates the estimate EGR ratio correction value on the basis of the gaseous state inside the introduction passage 30 and the EGR valve pass through gas amount. As described above, by considering the gaseous state at the timing that the EGR valve 11 opens when calculating the estimate EGR ratio corrected amount, it is possible to calculate a more accurately estimated EGR ratio correction amount.

As described above, according to the present embodiment, the controller 100 varies the correction amount of the estimate EGR ratio in accordance with the fresh air amount inside the introduction passage 30 at the timing that the EGR valve 11 opens; thus, the estimation accuracy of the joining portion EGR ratio estimate value improves.

Third Embodiment

The third embodiment has the same configuration of the internal combustion engine system as the first embodiment, however differs in the calculation method of the joining portion EGR ratio estimate value.

Figure 11:
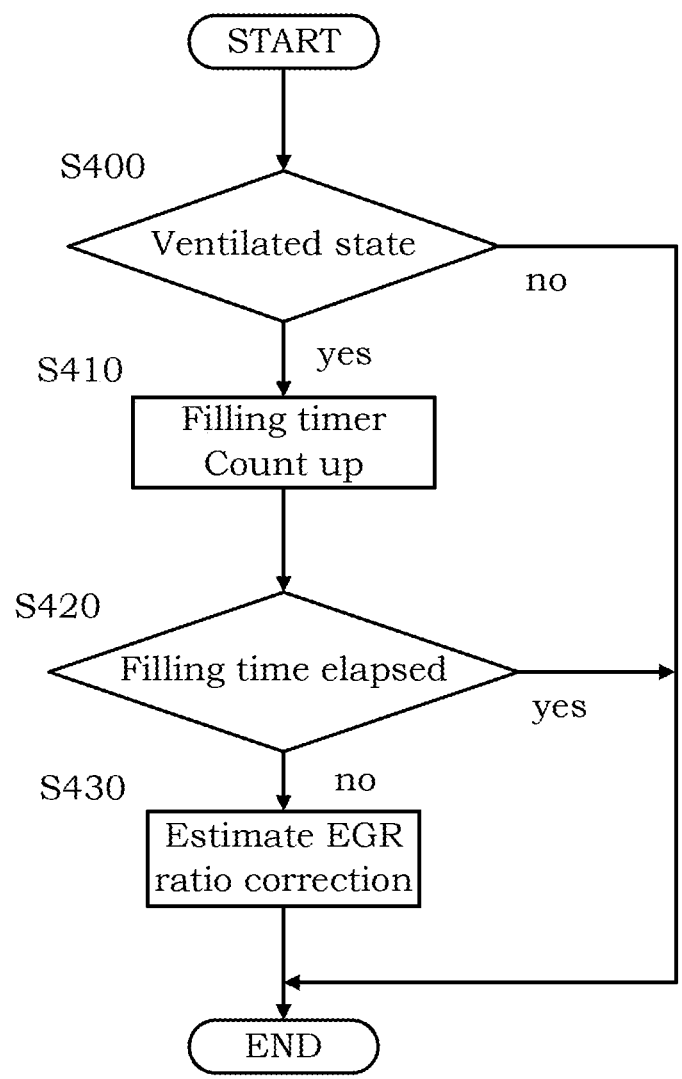
FIG. 11 is a flow chart showing an estimate EGR ratio correction operation routine of a third embodiment.

FIG. 11 shows a routine for calculating the joining portion EGR ratio estimate value that the controller 100 performs, in a flow chart.

In step S400, the controller 100 determines whether or not the inside of the introduction passage 30 is in the ventilated state, and if it is in the ventilated state the process of step S410 is performed, and if not in the ventilated state this routine ends. The present step is the same process as step S100 of FIG. 6. That is to say, whether or not it is in the ventilation state is determined by performing the control routine of FIG. 7.

In step S410, the controller 100 measures the time elapsed from the timing that the EGR valve 11 opens, with a built-in filling timer.

In step S420, the controller 100 determines whether or not the filling time is elapsed; if elapsed the present routine ends, and if not elapsed the process of step S430 is performed. The filling time is a time required for the inside of the introduction passage 30 to become a filled state filled with the EGR gas, and is set in advance on the basis of the EGR valve passing gas amount assumed from an opening area of the EGR valve 11 and the volume Vd of the introduction passage 30.

In step S430, the controller 100 corrects the estimated EGR ratio as described later, and calculates the joining portion EGR ratio estimate value.

That is to say, in the present embodiment, the controller 100 performs the correction of the estimate EGR ratio just when the EGR valve 11 is opened at the ventilated state. Further, the period that this correction is performed is from when the EGR valve 11 opens to until a filling time set in advance elapses.

Furthermore, after the present routine is ended, the joining portion EGR ratio estimate value is calculated on the basis of the EGR valve passing gas amount, as with the first embodiment.

Figure 12:
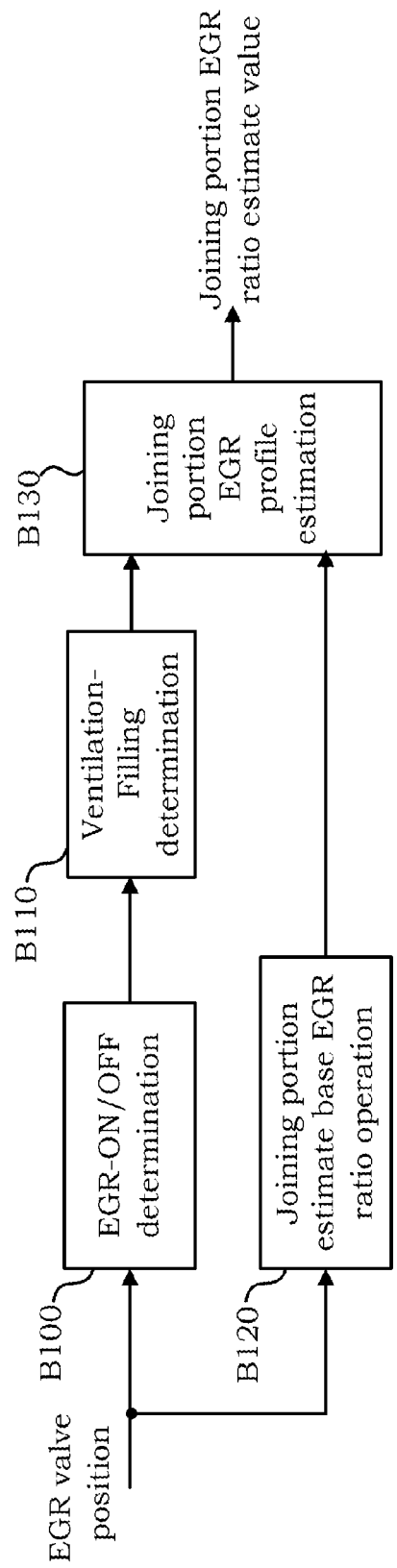
FIG. 12 is a block diagram showing details of an operation for calculating a joining portion EGR ratio estimate value of the third embodiment.

FIG. 12 is a block diagram showing details of operation for calculating the aforementioned joining portion EGR ratio.

An EGR-ON/OFF determining portion B100 reads in the EGR valve position, and determines whether the EGR valve 11 is in the open state or the closed state, that is to say, whether or not the EGR control is being performed, on this basis. That is to say, this is equivalent to step S200 of FIG. 7. The determination results of the EGR-ON/OFF determining portion B100 is read into the ventilation-filling determining portion B110.

The ventilation-filling determining portion B110 determines whether or not the introduction passage 30 is in the ventilated state while performing the EGR control, and determines whether or not the introduction passage 30 is in the filled state while not performing the EGR. This determination is the same as the processes of step S400, S420 in FIG. 11. The determination here is performed on the basis of whether or not the counter value of the ventilation timer exceeds the ventilation time, and whether or not the counter value of the filling timer exceeds the filling time. Therefore, after the EGR valve 11 closes, in a case in which the EGR valve 11 is opened before becoming in the ventilated state, it is determined as the filled state. On the other hand, after the EGR valve 11 opens, in a case in which the EGR valve 11 closes before becoming in the filled state, it is determined as the ventilated state.

The joining portion estimate base EGR ratio operating portion B120, as with the joining portion estimate base EGR ratio operating portion B10 in FIG. 8 and FIG. 10, calculates the variation characteristic of the joining portion estimate base EGR ratio based on the EGR valve position, that is to say, the variation characteristic equivalent to the solid line in FIG. 5.

The joining portion EGR profile estimating portion B130 corrects the joining portion estimate base EGR ratio on the basis of the determination result of the ventilation-filling determining portion B110 and the joining portion estimate base EGR ratio, and calculates the joining portion EGR ratio estimate value. For example, in a case in which the inside of the introduction passage 30 is in the ventilation state at the timing that the EGR valve 11 opens, the joining portion EGR ratio estimate value is calculated by the correction similar to that of the first embodiment until it becomes in the filled state. On the other hand, in the case in which the inside of the introduction passage 30 is in the filled state at the timing that the EGR valve 11 opens, no correction is performed, and the joining portion estimate base EGR ratio serves as the joining portion EGR ratio estimate value as it is.

In the joining portion EGR profile estimating portion B130, in a case in which determination is made to be in the ventilated state, a target fresh air flow amount determined from the engine operating state is read in, and an inclination of the variation characteristic of the joining portion estimate base EGR ratio may be corrected, to restrict on the basis of the target fresh air flow amount, until the introduction passage 30 becomes in the filled state. In this case, by looking up and storing in advance, for each of the target fresh air flow amounts, the variation characteristic of the joining portion estimate base EGR ratio that has restricted the inclination to allow for preventing the knocking, it is possible to calculate the joining portion EGR ratio estimate value that allows for preventing the knocking, from the stored variation characteristic and the EGR valve opening timing.

Figure 13:
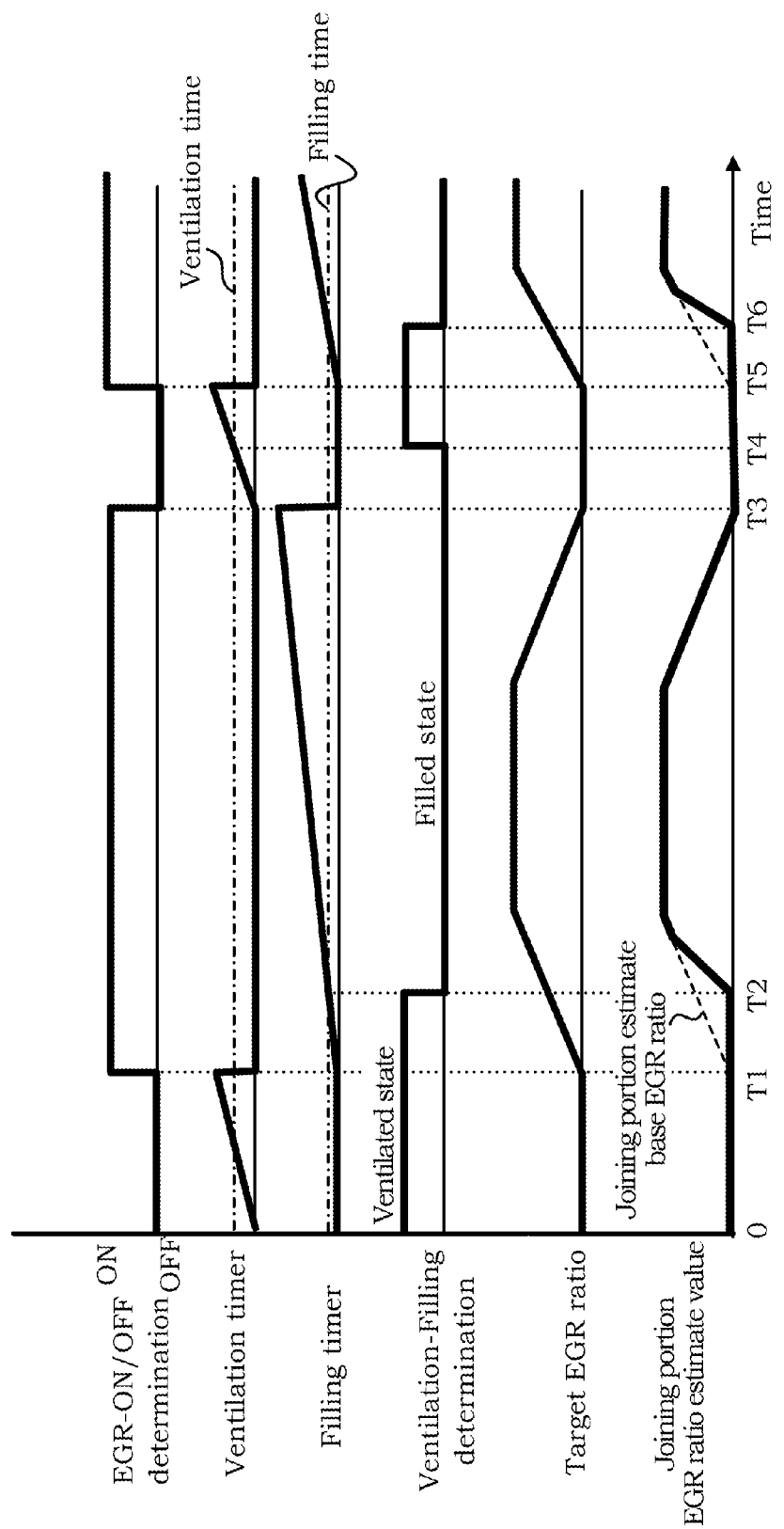
FIG. 13 is a timing chart in a case of performing the routine of FIG. 11.

FIG. 13 is a timing chart in a case of performing the calculation routine shown in FIG. 11.

At the timing T1, when the EGR control starts at the ventilated state, the ventilation timer is reset, and the filling timer starts its counting.

Once the EGR control starts, until it is determined at timing T2 as in the filled state, the joining portion EGR ratio estimate value is calculated by correcting the joining portion estimate base EGR ratio as described above. Furthermore, from the timing T2 and on, the joining portion EGR ratio estimate value is calculated on the basis of the EGR valve passing gas amount. As a result, the joining section EGR ratio estimate value starts to increase slower than that of the joining portion estimate base EGR ratio.

Moreover, when the EGR control ends and the EGR valve 11 closes at timing T3, the ventilation timer starts its counting, and the filling timer is reset. Furthermore, when it is determined as the ventilated state at timing T4 and the EGR control is restarted and the EGR valve 11 opens at timing T5, correction of the joining portion estimate base EGR ratio is performed until timing T6 at which it again becomes the filled state.

Supposing that in a case in which the EGR control is restarted before the timing T4, the inside of the introduction passage 30 will be determined as the filled state, so the above correction will not be performed. This is because since the EGR gas remains inside the introduction passage 30, the divergence between the joining portion EGR ratio estimate value and the actual EGR ratio is small, compared to a case in which it is in the ventilated state and the above correction is not performed.

According to the present embodiment as described above, as with the first embodiment, the divergence between the joining portion EGR ratio estimate value and the actual EGR ratio is minimized, thus allowing for preventing the knocking without reducing the EGR introduction speed. Furthermore, the determination of whether or not it is in the ventilated state and the determination of whether or not it is in the filled state are determined by using the counter values of the timers, so the above effect is achievable without increasing the operational load.

The above describes an embodiment of the present invention, however the above embodiment merely shows one part of an applied example of the present invention and has no intention to limit the technical scope of the present invention to the specific configurations disclosed in the above embodiment.

The invention claimed is:

1. An EGR control device configured to control an EGR device, the EGR device is configured by including:
   an EGR passage branching out from an exhaust passage of an internal combustion engine and joining to an intake passage; and
   an EGR valve disposed in the EGR passage,
   the EGR control device comprising:
   an estimate EGR ratio calculating portion configured to calculate an estimate EGR ratio from a fresh air flow amount at a joining portion of the intake passage with the EGR passage, and an EGR gas amount passing through the EGR valve; and
   a joining portion EGR ratio estimating portion configured to correct the estimate EGR ratio small on the basis of a gaseous state inside the EGR passage from the EGR valve to the joining portion with the intake passage when the EGR valve switches from a closed state to an open state, and make the estimate EGR ratio serve as a joining portion EGR ratio being a proportion of the EGR gas amount with respect to fresh air in the joining portion.

2. The EGR control device according to claim 1, wherein the joining portion EGR ratio estimating portion performs the correction of the estimate EGR ratio until an EGR valve passing gas integrated amount exceeds a volume of the EGR passage from the EGR valve to the joining portion with the intake passage, the EGR valve passing gas integrated amount being a integrated value of a volume flow amount of EGR gas passing through the EGR valve from after the EGR valve has switched from a closed state to an open state.

3. The EGR control device according to claim 2, wherein the joining portion EGR ratio estimating portion calculates the EGR valve passing gas integrated amount on the basis of a position of the EGR valve, a differential pressure across the EGR valve, and a temperature of the EGR gas.

4. The EGR control device according to claim 3, wherein the position of the EGR valve is controlled on the basis of a target EGR ratio set on the basis of an engine operating state of the internal combustion engine and a fresh air amount calculated on the basis of the engine operating state of the internal combustion engine.

5. The EGR control device according to claim 2, wherein the joining portion EGR ratio estimating portion calculates the EGR valve passing gas integrated amount on the basis of a target EGR ratio set on the basis of an engine operating state of the internal combustion engine and a fresh air amount detected by an air flow meter.

6. The EGR control device according to claim 2, wherein the joining portion EGR ratio estimating portion determines, on the basis of an elapsed time from a timing at which the EGR valve opens, whether or not an EGR valve passing gas integrated amount exceeds a volume inside the EGR passage from the EGR valve to the joining portion with the intake passage, the EGR valve passing gas integrated amount being a integrated value of EGR gas passing through the EGR valve.

7. The EGR control device according to claim 1, wherein the joining portion EGR ratio estimating portion corrects the estimate EGR ratio just when the inside of the intake passage from the EGR valve to the joining portion at a time in which the EGR valve is opened is of a ventilated state filled with fresh air.

8. The EGR control device according to claim 7, wherein the joining portion EGR ratio estimating portion determines whether or not the inside of the intake passage is in the ventilated state on the basis of an elapsed time from a timing at which the EGR valve is closed.

9. The EGR control device according to claim 1, wherein the joining portion EGR ratio estimating portion changes a correction amount of the estimate EGR ratio in accordance with an amount of fresh air inside the EGR passage from the EGR valve to the joining portion with the intake passage at a time at which the EGR valve opens.

10. The EGR control device according to claim 1, wherein the joining portion EGR ratio estimating portion calculates the joining portion EGR ratio on the basis of a variation ratio per unit time of the estimate EGR ratio being restricted to allow for preventing knocking in accordance with a target fresh air flow amount defined by an engine operating state, and an elapsed time from an opening timing of the EGR valve.

11. An EGR control method of controlling an EGR device configured including:
   an EGR passage branching out from an exhaust passage of an internal combustion engine and joining to an intake passage, and
   an EGR valve disposed in the EGR passage,
   the EGR control method comprising:

calculating an estimate EGR ratio from a fresh air amount at a joining portion of the intake passage with the EGR passage and an EGR gas amount passing through the EGR valve; and correcting the estimate EGR ratio to decrease with a smaller EGR gas amount inside the EGR passage from the EGR valve to the joining portion on the basis of a gaseous state inside the EGR passage from the EGR valve to the joining portion with the intake passage when the EGR valve switches from a closed state to an open state, to make the estimate EGR ratio serve as a joining portion EGR ratio being a proportion of the EGR gas amount with respect to fresh air in the joining portion.

* * * * *